(12) United States Patent
Ginosar et al.

(10) Patent No.: US 7,718,051 B2
(45) Date of Patent: May 18, 2010

(54) CONVERSION OF CROP SEED OILS TO JET FUEL AND ASSOCIATED METHODS

(75) Inventors: Daniel M. Ginosar, Idaho Falls, ID (US); Lucia M. Petkovic, Idaho Falls, ID (US); David N. Thompson, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 229 days.

(21) Appl. No.: 11/856,607

(22) Filed: Sep. 17, 2007

(65) Prior Publication Data
US 2009/0071872 A1 Mar. 19, 2009

(51) Int. Cl.
*C10G 47/00* (2006.01)

(52) U.S. Cl. .......... 208/113; 208/120.01; 208/120.15; 208/120.35; 208/133; 502/202; 502/220; 502/221; 502/222; 502/223; 502/224; 502/225; 502/226; 502/227; 502/228

(58) Field of Classification Search ............... 208/107, 208/112, 133, 134, 113, 120.01, 120.15, 208/120.35; 502/202, 220–229
See application file for complete search history.

(56) References Cited

U.S. PATENT DOCUMENTS

| 3,230,165 | A | * | 1/1966 | Cunningham | 208/89 |
| 3,268,436 | A | | 8/1966 | Arey, Jr. et al. | |
| 6,419,820 | B1 | * | 7/2002 | Bogdan et al. | 208/138 |
| 6,875,341 | B1 | | 4/2005 | Bunger et al. | |
| 2004/0230085 | A1 | * | 11/2004 | Jakkula et al. | 585/240 |
| 2005/0112056 | A1 | | 5/2005 | Hampden-Smith et al. | |
| 2005/0167337 | A1 | | 8/2005 | Bunger et al. | |
| 2006/0059770 | A1 | | 3/2006 | Sutkowski et al. | |
| 2006/0102519 | A1 | | 5/2006 | Tonkovich et al. | |
| 2006/0196109 | A1 | | 9/2006 | Morton et al. | |

OTHER PUBLICATIONS

Agency for Toxic Substances and Disease Registry (ATSDR). 1995. Toxicological profile for fuel oils. Atlanta, GA: U.S. Department of Health and Human Services, Public Health Service.*
Alencar et al., "Pyrolysis of tropical vegetable oils," 1983, J. Agr. Food Chem. 31, 1268.
Demirbas, A., "Biodiesel fuels from vegetable oils via catalytic and non-catalytic supercritical alcohol transesterifications and other methods: a survey," 2003, Energy Conversion and Management 44, 2093.
Da Rocha Filho et al., "Formation of Alkanes, Alkylcycloalkanes, and Alkylbenzenes During the Catalytic Hydrocracking of Vegetable Oils," 1993, Fuel, pp. 72:42, 543.
Kloprogge et al., "A review of the synthesis and characterisation of pillared clays and related porous materials for cracking of vegetable oils to produce biofuels," 2005, Environ. Geol. 47, 967.

(Continued)

*Primary Examiner*—Robert J Hill, Jr.
*Assistant Examiner*—Brian McCaig
(74) *Attorney, Agent, or Firm*—TraskBritt

(57) ABSTRACT

Aspects of the invention include methods to produce jet fuel from biological oil sources. The method may be comprised of two steps: hydrocracking and reforming. The process may be self-sufficient in heat and hydrogen.

20 Claims, 1 Drawing Sheet

OTHER PUBLICATIONS

Bahadur et al., "Liquid hydrocarbons from catalytic pyrolysis of sewage sludge lipid and canola oil: evaluation of fuel properties," 1995, Energy and Fuels 9, 248.

"Detail Specification, Turbine Fuels, Aviation, Kerosene Types, NATO F-34 (JP-8), NATO F-35, and JP-8+100," MIL-DTL-83133E, Apr. 1, 1999, pp. 1-15.

Boocock et al., "Fuels and chemicals from sewage sludge 2. The production of alkanes and alkenes by the pyrolysis of triglycerides over activated alumina," 1992, Fuel 71, 1291.

Chang et al., "China's motor fuels from tung oil," 1947, Ind. Eng. Chem. 39, 1543.

Idem et al., "Thermal cracking of canola oil: reaction products in the presence and absence of steam," 1996, Energy Fuels 10, 1150.

Gusmao et al., "Utilization of vegetable oils as an alternative source for diesel-type fuel: hydrocracking on reduced nickel/silicon and sulfided nickel/molybdenum/gamma-alumina," 1989, Catal. Today 5, 533.

Katikaneni et al., "Studies on the catalytic conversion of canola oil to hydrocarbons: influence of hybrid catalysts and steam," 1995, Energy Fuels 9, 599.

Saynor et al., "The Potential for Renewable Energy Sources in Aviation," Imperial College, London, <<www.iccept.ic.ac.ik>> Aug. 2003, pp. 1-78.

* cited by examiner

CONVERSION OF CROP SEED OILS TO JET FUEL AND ASSOCIATED METHODS

GOVERNMENT RIGHTS

This invention was made with government support under Contract No. DE-AC07-99ID13727 and Contract No. DE-AC07-05ID14517 awarded by the United States Department of Energy. The government has certain rights in the invention.

FILED OF THE INVENTION

The present invention relates generally to jet fuels and the production of jet fuels. More specifically, embodiments of the present invention relate to the production of jet fuels, such as JP-8, from crop seed oils using a hydrocracking and reforming process.

BACKGROUND OF THE INVENTION

Kerosene-type jet fuels comprise primarily hydrocarbons containing between about eight and 16 carbon atoms in their molecules. The hydrocarbons that boil near the middle of the kerosene-type jet fuel boiling range may be $C_{10}$ aromatics, $C_{11}$ naphthenes, and $C_{12}$ paraffins. According to previous studies, neither thermal nor catalytic cracking of vegetable oils appears to produce high levels of hydrocarbon fractions that would meet jet fuel specifications, such as those for JP-8.

BRIEF SUMMARY OF THE INVENTION

An embodiment of the present invention comprises a method for producing jet fuel that comprises hydrocracking and then reforming oil from a biological source. After reforming, the resulting product may be flash evaporated and distilled to produce a jet fuel. The method may be hydrogen and heat self-sufficient.

BRIEF DESCRIPTION OF THE DRAWING

It will be appreciated by those of ordinary skill in the art that the elements depicted in the drawing are for purpose of example only. The nature of the present invention, as well as other embodiments of the present invention, may be more clearly understood by reference to the following detailed description of the invention, to the appended claims, and to the drawing, in which:

DETAILED DESCRIPTION OF THE INVENTION

Figure 1:
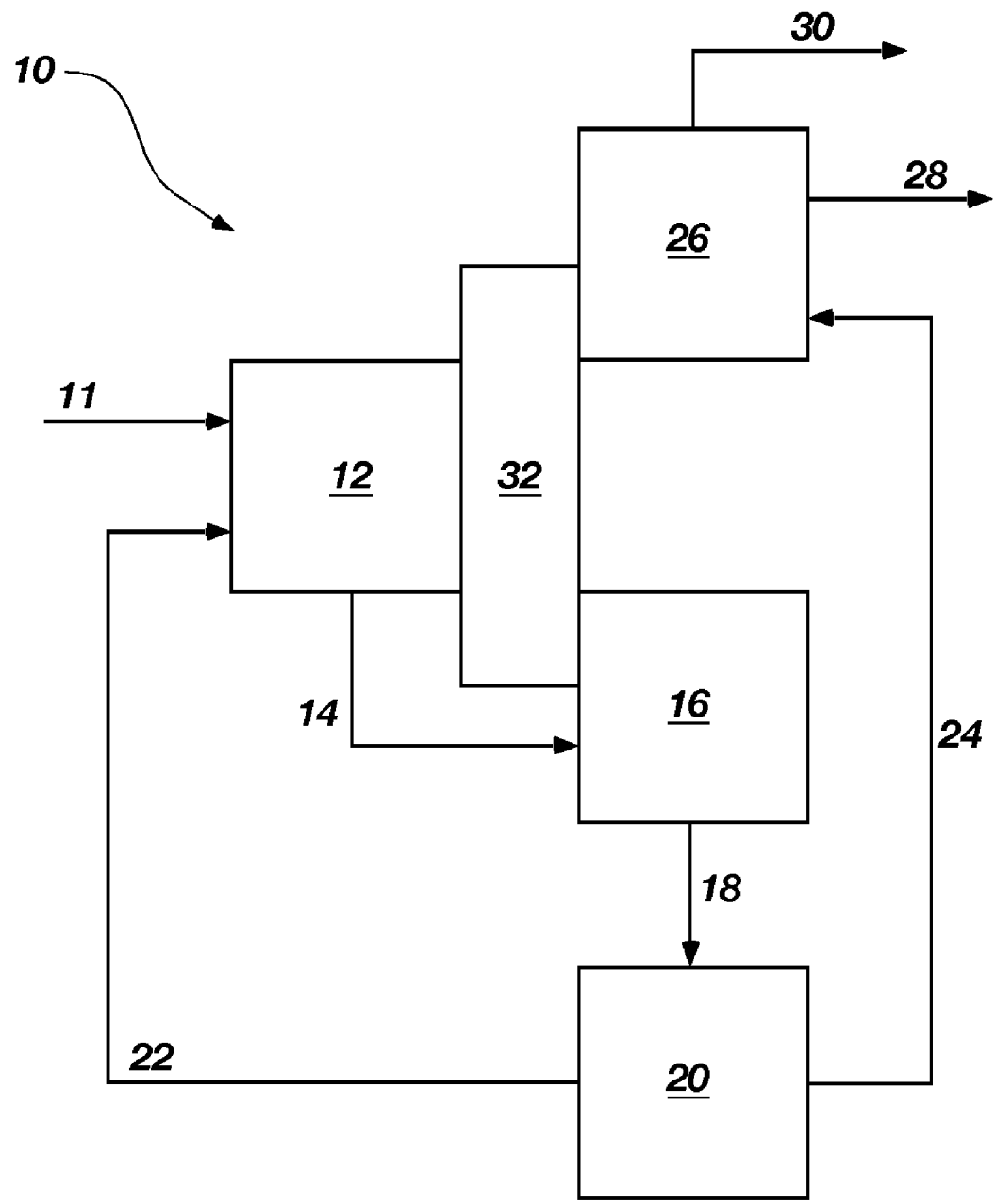
FIG. 1 is a schematic diagram of an integrated process flow according to the present invention.

In some embodiments of the present invention, oil from a biological source may be used to create jet fuel. In further embodiments, the oil from a biological source may include, but is not limited to, crop seed oils, vegetable oils, animal oils, animal fats, and combinations thereof. In some embodiments, the crop seed oils may be isolated from sources such as, but not limited to, rapeseed oil, sunflower oil, mustard oil, canola oil, peanut oil, palm oil, soybean oil, and combinations thereof. In further embodiments, the oils may include animal fats, waste oil, yellow grease, brown grease, and combinations thereof. In a broad sense, the oils from a biological source may comprise oil from a renewable or a non-renewable source. In some embodiments, the oil from a biological source may be at least one of distilled, separated, partially purified, and purified to increase or decrease the content of a particular component of the oil from a biological source. In some embodiments, the particular component may be, but is not limited to, triglycerides, diglycerides, monoglycerides, saturated fatty acids, unsaturated fatty acids, trilaurin, erucic acid, lauric acid, oleic acid, linoleic acid, linolenic acid, stearic acid, palmitic acid, and combinations thereof. In some embodiments, the oil from a biological source may contain 40%, 50%, 60%, 70%, 80%, 90%, or 95% or more of any of the aforementioned components.

In some embodiments of the invention, the oil from a biological source may be selected based upon the type of fuel or the properties of the fuel to be generated. By way of non-limiting example, if a fuel with C11-C14 weight range is desired, one may select starting oils that contain a majority of fatty acid hydrocarbon chains (excluding the carbonyl carbon) that are no smaller than C11-C14 if they are saturated, or unsaturated chains longer than C11-C14 having saturated lengths between double bonds of at least C11-C14.

In further embodiments, the jet fuel may be any jet fuel meeting specified standards, including, but not limited to, kerosene-type jet fuels, naptha-type jet fuels, Jet A, Jet A-1, Jet B, JP-1, JP-4, JP-5, JP-7, JP-8, and JPTS. In further embodiments, the jet fuel may comprise additional additives including, but not limited to, antioxidants, antistatic agents, corrosion inhibitors, and fuel system icing inhibitors (FSIIs). In such embodiments, antioxidants may include, but are not limited to, alkylated phenols, AO-30, AO-31, AO-32, and/or AO-37. In such embodiments, antistatic agents may include, but are not limited to, STADIS® 425, STADIS® 450, and/or dinonylnaphthylsulfonic acid (DINNSA). In such embodiments, corrosion inhibitors may include, but are not limited to, DCI-4A, DCI-6A, DCI-11, DCI-28, DCI-30, and/or DMA-4. In such embodiments, FSIIs may include, but are not limited to, PRIST®, ethylene glycol monomethyl ether (EGMME), 2-methoxy ethanol, APISOLVE® 76, diethylene glycol monomethyl ether (DEGMME), 2-(2-methoxy ethoxy)ethanol, APITOL® 120, methyl carbitol, and/or anhydrous isopropyl alcohol.

In some embodiments of the invention, the oil from a biological source may be hydrocracked to yield smaller molecular weight species. In one embodiment of the invention, trilaurin may be hydrocracked according to the process of the reaction in equation (1):

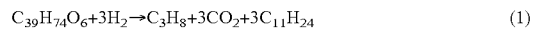

$$C_{39}H_{74}O_6 + 3H_2 \rightarrow C_3H_8 + 3CO_2 + 3C_{11}H_{24} \tag{1}$$

In certain embodiments, hydrocracking may be undertaken in the presence of a catalyst. Examples of suitable catalysts include, but are not limited to, catalysts based on NiMo and/or CoMo supported on alumina, catalysts based on NiW supported on alumina and/or on a zeolite, and catalysts based on Ni supported on alumina. In such embodiments, a catalyst may be sulfided in situ. In such embodiments, the catalyst may be provided and/or used as part of a continuous flow packed bed catalyst system.

As is understood by one of ordinary skill in the art, the temperature and/or pressure at which a hydrocracking reaction is allowed to take place may be tailored to the specific catalyst, the nature of the incoming feed stream, and the desired end products. By way of non-limiting example, hydrocracking reactions occurring at higher temperature and/or pressure tend to produce products with shorter length carbon chains than hydrocracking reactions occurring at lower temperature and or pressure. The pressures at which the hydrocracking process may take place include, but are not limited to, from about 200 psi to about 5000 psi; about 500 psi to about 2500 psi; about 500 psi to about 2000 psi; and about 700 psi. In some embodiments, temperatures at which the hydrocracking process may take place include, but are not limited to, about 350° C. to about 825° C.; about 400° C. to about 825° C.; about 350° C. to about 450° C.; about 400° C., and about 350° C. In one embodiment, the reaction according to equation (1) is run over a NiMo catalyst supported on alumina at a temperature of about 350° C. and a pressure of about 700 psi. In some embodiments, an incoming hydrogen gas stream may be pressurized before or after being combined with the incoming oil from a biological source. The hydrocracking process may be a net exothermic process. In some embodiments, the reaction according to equation (1) may produce about 235 MJ/sec of thermal energy. In implementing embodiments of the invention, an oil from a biological source, a catalyst, pressure, reactor space velocity, hydrogen-to-hydrocarbon ratio, and temperature may be selected in order to maximize products in the $C_{10}$ to $C_{14}$ range.

In further embodiments, hydrocracking may take place in a series of one or more reactors. In some embodiments, coolers or heat exchangers may be installed between reactors in order to respectively drop or raise the temperature of the reactants as they pass between the reactors. In an additional embodiment, after the reactants have passed through one or more reactors, the mixture may be heated, allowing for further reaction of the products. In still further embodiments, one or more reactors may have cooling elements or heat exchangers associated with them so that all or part of the contents of the reactor may be cooled. In other embodiments, any unreacted hydrogen may be fed back into the start of the process. The unreacted hydrogen may be compressed, heated, and/or cooled before being fed back into the start of the process. In some embodiments, a gas mass flow controller may be used to provide and/or regulate incoming hydrogen gas. In some embodiments, the hydrogen-to-hydrocarbon ratio may be kept between about 3:1 and about 9:1 during hydrocracking.

In various embodiments, cooling or heating apparatus may be used to control the temperature of the reactants, the reaction vessels, or both. In some embodiments, heat generated from the hydrocracking process may be recaptured, for example, using a heat exchanger, and may be used for other purposes. Recaptured heat, for example, may be used, in whole or in part, to heat other reactors, reaction vessels, or reactants, and/or to raise steam to drive compressors for compressing the incoming gas streams or for cooling. In embodiments of the invention, once the process is started, the process may be energy self-sufficient and/or a net energy exporter.

In further embodiments, after hydrocracking, the resultant products may be cooled and the liquids may be dropped out due to cooling, and collected. In some embodiments, resultant gases or liquids may be analyzed using standard techniques, such as by flow into a gas chromatograph (GC) for analysis. Collected liquids may also be analyzed by GC.

In a further embodiment, the resulting products from a hydrocracking reaction may be reformed. In embodiments of the invention, the n-undecane resulting from reaction (1) is reformed to yield hydrogen gas and n-pentylbenzene according to the process of reaction (2):

$$C_{11}H_{24} \rightarrow C_{11}H_{16} + 4H_2 \qquad (2)$$

In further embodiments of the invention, the reforming of n-undecane is allowed to proceed to about a 25% reaction completion, resulting in about a 3:1 molar ratio of n-undecane and n-pentylbenzene.

In some embodiments, reforming may be undertaken in the presence of a catalyst. Examples of catalysts include, but are not limited to, catalysts based on platinum/rhenium and/or platinum/tin supported on chlorided alumina. In such embodiments, platinum metal may provide a hydrogen adsorption function, and rhenium and/or tin may be used to reduce deactivation. The acidic chlorided alumina may provide an isomerization and/or cyclization function and the catalyst may be chlorided prior to use and/or in situ. In some embodiments, the catalyst may be provided and/or used as part of a continuous flow packed bed catalyst system.

As is understood by one of ordinary skill in the art, the temperature and/or pressure at which a reforming reaction is allowed to take place may be tailored to the specific catalyst, the incoming feed stream, and the desired end products. By way of non-limiting example, reforming reactions to dehydrogenate napthalenes to aromatics are most productive at low pressures and higher temperatures, while increasing the pressure leads to increased hydrocracking and less reforming. The pressures at which a reforming process may take place include, but are not limited to, from about 73 psi to about 660 psi; about 73 psi to about 300 psi; about 200 psi to about 660 psi; about 200 psi to about 300 psi, and about 300 psi. In some embodiments, temperatures at which the reforming process may take place include, but are not limited to, about 250° C. to about 520° C.; about 250° C. to about 495° C.; about 250° C. to about 350° C.; about 300° C.; and about 250° C. In one embodiment, the reaction according to equation (2) is run over a platinum/rhenium catalyst supported on chlorided alumina at a temperature of about 250° C. and a pressure of about 300 psi. In some embodiments, an incoming product of hydrocracking reaction may be pressurized before or after contact with the catalyst. The reforming process may be a net endothermic process. In some embodiments, the reaction according to equation (2) may consume about 24 MJ/sec of thermal energy. In some embodiments, the hydrogen-to-hydrocarbon ratio may be kept between about 2:1 and about 8:1 during reforming. In embodiments of the invention, the incoming feed stock, catalyst, pressure, reactor space velocity, hydrogen to hydrocarbon ration, and temperature may be selected in order to minimize cracking and to provide sufficient hydrogen for the reaction according to equation (1).

In certain embodiments, incoming products from a hydrocracking reaction may be heated before introduction to the catalyst. In some of these embodiments, the incoming products from a hydrocracking reaction may be vaporized before introduction to the catalyst.

In further embodiments, reforming may take place in a series. In some embodiments, coolers or heat exchangers may be installed between the one or more reactors in order to drop or raise the temperature of the reactants as they pass between the reactors. In an additional embodiment, after the reactants have passed through one or more reactors, the mixture may be heated or cooled, allowing for further reaction or distillation of the products. In still further embodiments, one or more reactors may have cooling elements or heat exchangers associated with them so that all or part of the contents of the reactor may be cooled. In other embodiments, any produced hydrogen may be fed into a hydrocracking reaction. In additional embodiments, produced hydrogen may be used in combustion to fuel heaters for heating reactants, reaction vessels, or for other purposes. The produced hydrogen may be at least one of compressed, heated, and cooled before being fed back into the start of the process. In some embodiments, the process may be hydrogen self-sufficient and/or a net exporter of hydrogen. In various embodiments, cooling or heating apparatus may be used to control the temperature of the reactants, the reaction vessels, or both.

In further embodiments, after reforming, the resultant products may be cooled and the liquids dropped out due to cooling, and collected. In some embodiments, resultant gases or liquids may be analyzed using standard techniques. Gasses may flow into a gas chromatograph (GC) for analysis. Collected liquids may also be analyzed by GC.

In a further embodiment, the products of the reforming reaction may be flash evaporated. In implementation of these embodiments, the products of the reforming reaction may enter into a pressure vessel ("flash drum") by passing through a throttling valve or other throttling device. Hydrogen gas may be collected from the flash drum and fed into a hydrocracking and/or reforming process. The resulting hydrogen gas may be collected and used for any purpose for which hydrogen gas is normally required.

In a further embodiment, the liquid products of the flash evaporation may be collected and distilled to yield jet fuel and/or other compounds. In some embodiments, the jet fuel may be formulated to meet all the standards for JP-8 as provided in MIL-DTL-83133E (the contents of which are hereby incorporated by reference).

FIG. 1 is a block diagram of an embodiment of an apparatus 10 according to the present invention. Depicted therein is a feed stream of oil from a biological source 11 that is provided to hydrocracker 12. The products of hydrocracker 12 are provided to reformer 16 via hydrocracked products conduit 14. Heat generated from hydrocracker 12 is stored and/or transferred via temperature adjustment apparatus 32 which may be, for example, but not limited to, a heat exchanger, a cooling apparatus, and/or a heating apparatus. In one embodiment, temperature adjustment apparatus 32 is configured to provide heat from hydrocracker 12 to at least one of reformer 16 and distilling unit 26.

Reformer 16 reforms the products of hydrocracker 12 and provides the reformed products to flash drum 20 via reformer products conduit 18. Flash drum 20 provides a hydrogen gas stream to hydrocracker 12 via hydrogen gas conduit 22. Flash drum 20 further provides products to distilling unit 26 via products conduit 24. Distilling unit 26 provides jet fuel via jet fuel conduit 28 and one or more other products via side products conduit 30.

EXAMPLE

The present invention is further described in the following example, which is offered by way of illustration and is not intended to limit the invention in any manner.

Example 1

Aspen Model of Process

A preliminary process model using the Aspen Plus code was constructed and run for this process. The model of the two-step reaction process was converged but not optimized. It was found that all the heat necessary to drive the process is supplied by the hydrocracking reaction and all the hydrogen needs for the hydrocatalytic reactions are supplied by the reforming reactor. Thus, the process has a high crop oil to jet fuel energy efficiency. The process is self-sufficient in terms of hydrogen and thermal requirements and is a net exporter of thermal energy in addition to the embodied energy of the jet fuel product.

Based on model results, assumptions, and corrections for anticipated cracking and rearrangement reactions, calculations suggest that the mass efficiency of the process to JP-8 will be roughly 55%, and the energy conversion efficiency for crop oil to jet fuel will be about 68%.

Example 2

Conversion of Trialurin to Jet Fuel

A feed of 100% Trialurin, a saturated triglyceride of lauric acid (dodecanoic acid, 1,2,3-propanetriyl ester) is used as the feed stock for a two-step production of a renewable oil-based synthetic JP-8 surrogate modeled from the mass and energy balance standpoint as consisting of 75 mol % n-undecane and 25 mol % n-pentylbenzene (3:1 molar ratio).

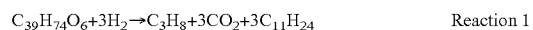

$$C_{39}H_{74}O_6 + 3H_2 \rightarrow C_3H_8 + 3CO_2 + 3C_{11}H_{24} \qquad \text{Reaction 1}$$

$$C_{11}H_{24} \rightarrow C_{11}H_{16} + 4H_2 \qquad \text{Reaction 2}$$

Running Reaction 2 at a 25% conversion of n-undecane gives the desired molar ratios of n-pentylbenzene and n-undecane in the synthetic JP-8 surrogate for mass and energy balance purposes:

Overall net chemistry with Reaction 2 at 25% conversion:

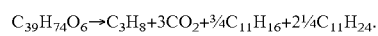

$$C_{39}H_{74}O_6 \rightarrow C_3H_8 + 3CO_2 + \tfrac{3}{4}C_{11}H_{16} + 2\tfrac{1}{4}C_{11}H_{24}.$$

The hydrogen produced in Reaction 2 is recycled to provide the hydrogen required for Reaction 1, and light hydrocarbon gases and any excess hydrogen are combusted to provide excess heat. Note that Reaction 1 is highly exothermic and, thus, provides additional process heat (Reaction 2 is endothermic). Thus, the process is a closed loop system with respect to thermal energy inputs and is a net heat producer. The reaction produces a JP-8 surrogate product stream modeled from the mass and energy balance standpoint as consisting of n-undecane and n-pentylbenzene. The components used to model the JP-8 surrogate from the mass and energy balance standpoint have the following heats of combustion: n-undecane, −47.5 MJ/kg; and n-pentylbenzene, −41.6 MJ/kg. The feed stream of trialurin has a heat of combustion of −37.1 MJ/kg.

Trialurin is fed into the hydrocracking reactor at a rate of 200 kmol/h (35.5 kg/s) at 25° C. and 1 atm. Reaction 1 is run over a NiMo catalyst supported on alumina at a temperature of about 350° C. and a pressure of about 700 psi. The n-undecane product of Reaction 1 is provided to the reforming reactor where 25% of the n-undecane is converted to n-pentylbenzene using a platinum/rhenium catalyst supported on chlorided alumina at a temperature of about 250° C. and a pressure of about 300 psi.

When the trialurin is provided at a feed rate of 35.5 kg/s, the hydrocracker produces 235 MJ/s of thermal energy. The reformer consumes 24 MJ/s of energy, during the 25% conversion of n-undecane to n-pentylbenzene, and a distillation column consumes 16 MJ/s. The process is thus a net exporter of thermal energy at a rate of 218 MJ/s, not including any combustion of non-jet fuel products. When the light hydrocarbon gases are combusted, the process exports 295 MJ/s of energy. Work energy necessary to run pumps and compressors is about 3.27 MJ/s. It should be noted that the excess thermal energy may be used to produce steam, which could be used to provide the needed work energy.

Example 3

Energy Efficiency

For the energy efficiency calculation, the heat input is taken to be zero since there is a net amount of heat coming out of the process. To be conservative, no credit was taken for this energy output and no credit was taken for any fuel products that could be used for non-jet fuel applications. Hence, the energy efficiency calculation gives:

$$\eta_E = \frac{E_{JP-8}}{E_{CropOil} + E_{Input}} =$$

$$\frac{[(19.2\,kg/s)(47.5\,MJ/kg) + (6.39\,kg/s)(41.6\,MJ/kg)]}{(35.5\,kg/s)(37.1\,MJ/kg) + 3.27\,MJ/s + 0\,MJ/s} = 89.1\%$$

The mass efficiency calculation is:

$$\eta_M = \frac{M_{JP-8}}{M_{CropOil}} = \frac{[19.2\,kg/s + 6.39\,kg/s]}{35.5\,kg/s} = 72.1\%$$

While this invention has been described in the context of certain embodiments, the present invention can be further modified within the scope thereof. This specification is therefore intended to cover any variations, uses, or adaptations of the invention using its general principles. Further, this specification is intended to cover such departures from the present disclosure as come within known or customary practice in the art to which this invention pertains and which fall within the limits of the appended claims and their legal equivalents.

What is claimed is:

1. A method of producing jet fuel, the method comprising:
providing oil from a biological source;
hydrocracking the oil from a biological source to produce a first product;
reforming the first product to form a second product and hydrogen;
flash evaporating the second product and hydrogen to separate the second product and hydrogen;
distilling jet fuel from the second product; and
using hydrogen formed from reforming the first product for hydrocracking the oil from the biological source.

2. The method of claim 1, further comprising using heat produced from hydrocracking the oil for reforming the first product and flash evaporating the second product and hydrogen.

3. The method of claim 2, wherein hydrocracking the oil from a biological source comprises hydrocracking oil from a biological source to produce more heat than reforming the first product and flash evaporating the second product and hydrocarbon consumes.

4. The method of claim 1, wherein reforming the first product comprises reforming the first product to produce more hydrogen than hydrocracking the oil from a biological source consumes.

5. The method of claim 1, wherein providing oil from a biological source comprises providing a majority of fatty acid carbon chains that are at least the same carbon weight as the desired carbon weight range of the jet fuel.

6. The method claim 1, wherein providing oil from a biological source comprises providing at least one of a crop seed oil, a vegetable oil, or an animal fat.

7. The method of claim 6, wherein providing the at least one of a crop seed oil, a vegetable oil, or an animal fat comprises providing at least one crop seed oil, a vegetable oil, or an animal fat selected from the group consisting of rapeseed oil, sunflower oil, mustard oil, canola oil, peanut oil, palm oil, soybean oil, waste oil, yellow grease, and brown grease.

8. The method of claim 6, wherein providing the at least one of a crop seed oil, a vegetable oil, or an animal fat comprises providing an oil selected from the group consisting of trilaurin, erucic acid, lauric acid, oleic acid, linoleic acid, linolenic acid, stearic acid, and palmitic acid.

9. The method of claim 1, wherein hydrocracking the oil from a biological source comprises hydrocracking the oil from a biological source using a catalyst selected from the group consisting of NiMo or CoMo supported on alumina, NiW supported on alumina or on a zeolite, and Ni supported on alumina.

10. The method of claim 9, wherein hydrocracking the oil from a biological source comprises hydrocracking the oil from a biological source at a pressure from about 200 psi to about 2000 psi.

11. The method of claim 9, wherein hydrocracking the oil from a biological source comprises hydrocracking the oil from a biological source using a sulfide catalyst.

12. The method of claim 9, wherein hydrocracking the oil from a biological source comprises hydrocracking the oil from a biological source at a temperature from about 350° C. to about 450° C.

13. The method of claim 9, wherein hydrocracking the oil from a biological source comprises hydrocracking the oil from a biological source using a NiMo catalyst supported on alumina at a pressure of about 700 psi and a temperature of about 350° C.

14. The method of claim 1, wherein reforming the first product comprises reforming the first product using a catalyst selected from the group consisting of platinum/rhenium supported on chlorided alumina and platinum/tin supported on chlorided alumina.

15. The method of claim 14, wherein reforming the first product comprises reforming the first product at a pressure from about 100 psi to about 500 psi.

16. The method of claim 15, wherein reforming the first product comprises reforming the first product at a temperature from about 250° C. to about 350° C.

17. The method of claim 14, wherein reforming the first product comprises reforming the first product using a platinum/rhenium catalyst supported on chlorided alumina at a pressure of about 300 psi and a temperature of about 150° C.

18. The method of claim 1, further comprising cooling the second product and hydrogen.

19. The method of claim 1, further comprising using excess heat from hydrocracking the oil from a biological source in at least one of reforming the first product and distilling jet fuel from the second product.

20. The method of claim 1, wherein distilling jet fuel from the second product comprises distilling a jet fuel that meets the specifications for JP-8 jet fuel.

* * * * *